July 15, 1969 W. W. PHARIS ET AL 3,456,081

PAY STATION COLLECT AND RETURN SYSTEM

Filed Nov. 29, 1966 2 Sheets-Sheet 1

W. W. PHARIS
G. F. NEUMEIER
INVENTORS

BY Dicke & Craig
ATTORNEYS

PAY STATION COLLECT AND RETURN SYSTEM

Filed Nov. 29, 1966 2 Sheets-Sheet 2

W. W. PHARIS
G. F. NEUMEIER
INVENTORS

BY Dicke & Craig
ATTORNEYS

United States Patent Office 3,456,081
Patented July 15, 1969

3,456,081

PAY STATION COLLECT AND RETURN SYSTEM

William W. Pharis and Guenther F. Neumeier, Rochester, N.Y., assignors to Stromberg-Carlson Corp., Rochester, N.Y., a corporation of Delaware Filed Nov. 29, 1966, Ser. No. 597,756
Int. Cl. H04m 17/02
U.S. Cl. 179—6.3 12 Claims

ABSTRACT OF THE DISCLOSURE

The present invention relates in general to communication systems and more particularly to a pay station collect and return system for use in connection with electronic telephone communication systems. The pay station adapter is formed in combination with the line circuit associated with subscriber pay station equipment and provides a voltage supply capable of effecting coin collect or coin return depending upon the polarity of the voltage transmitted to the subscriber equipment. Control of the voltage source in the pay station is effected from the register processer in the common control equipment and is applied through the universal junctor and line link network to a special control relay which makes the proper polarity of coin control voltage available for application to the subscriber equipment upon subscriber release. Relay means are also provided in the pay station for preventing closure of the direct current loop from the line circuit to the line link network. In addition, a coin release relay is provided for effecting application of a coin release voltage to the subscriber equipment during a stuck coin condition each time the switch hook is flashed.

Figure 1:
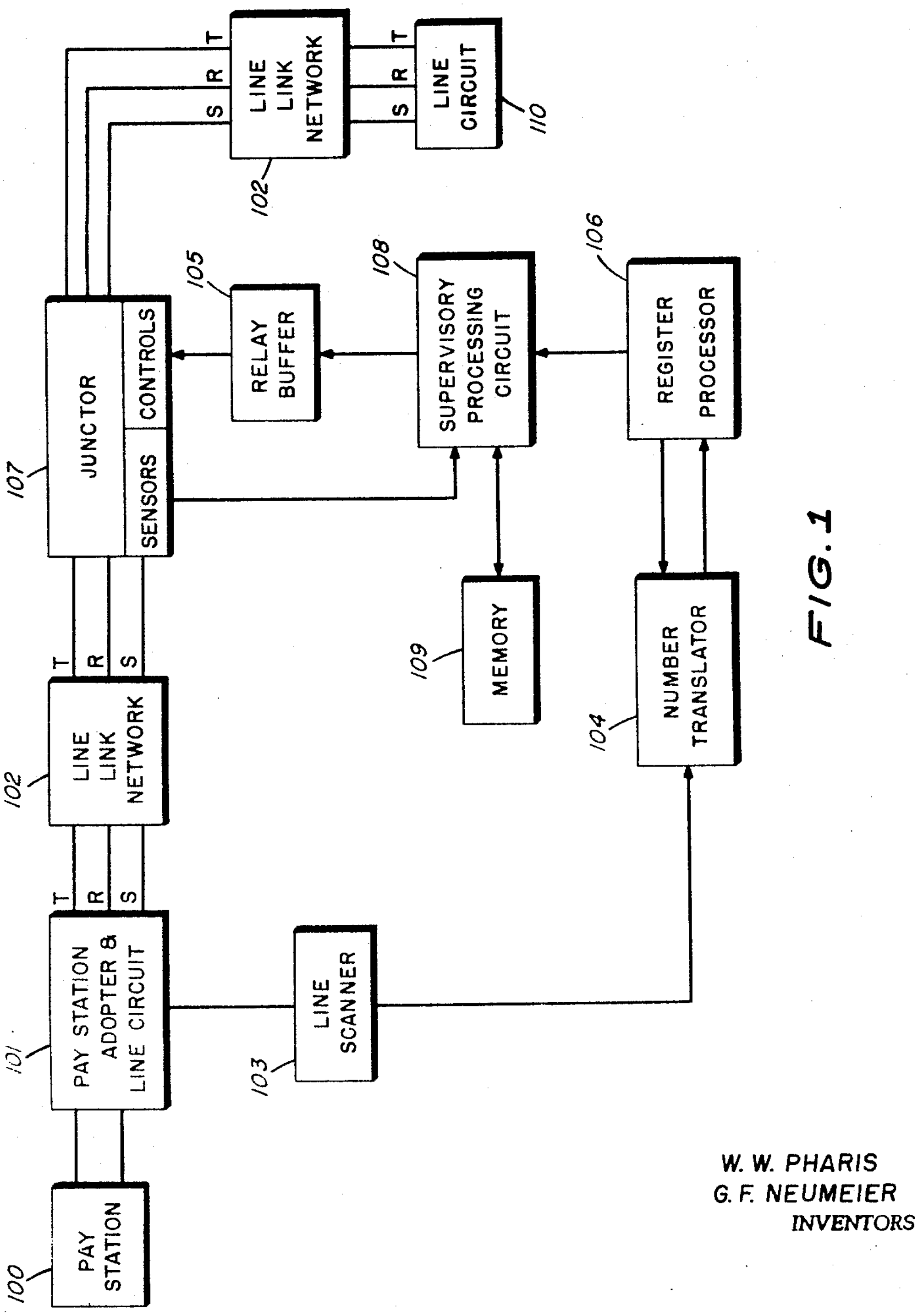

A common control system including a single programmed control circuit for use with electronic telephone systems capable of effecting association of the common control circuits necessary for establishing a communication connection between calling and called subscriber line circuits in response to detection of line conditions on a time division multiplex basis is disclosed in copending application Ser. No. 552,283, filed by James G. Pearce et al. on May 23, 1966, entitled "Universal Junctor," and assigned to the same assignee to which the present application is assigned. The programmed control provided by this common control system not only effects establishment of a communication connection between calling and called subscribers, but also provides the facilities of a plurality of special features circuits including malicious call, add-on conference, etc.

In copending application Ser. No. 570,563, filed by James G. Pearce et al. on Aug. 5, 1966, and assigned to the same assignee to which the present application is assigned, an add-on conference circuit for use in connection with the aforementioned common control circuit is disclosed. In this add-on conference circuit, a call established between originating and terminating subscribers may be extended to a third party subscriber upon request by one of the original parties having the special features class of serivce.

The present invention is desinged particularly for use in connection with common control systems such as disclosed in the aforementioned copending patent applications, and is particularly related to the functions of coin collect and coin return associated with pay station telephones associated with such common control systems. As is well known, pay station telephone equipment includes means for receiving, detecting the presence of, and holding coins deposited therein for purposes of obtaining access to a telephone line circuit. In the normal pay station equipment, detection of the proper coins is necessary to completion of the line circuit connection to the pay station equipment and return of dial tone for purposes of effecting a telephone call. In addition, means must be provided for collecting the coins upon termination of a completed call, or in the case of a "no charge" call, such as a request for information, or call to the telephone company, for which there is no charge, or an incomplete call in the case of a busy line condition or malfunction of the telephone equipment, means must be provided for effecting refund of the coins deposited. In electronic telephone communication systems, such as disclosed in the above-mentioned copending applications, the determination that a pay station is involved in the call, that the call has been answered and that the call is one that requires collection of deposited coins, is determined by various circuit elements in the system such as the number translator, common register processer and supervisory processing circuit. In the above-mentioned application S.N. 552,283, a number translator is provided in the system for determining the status of the calling party, i.e., that it is a regular subscriber or a pay station. The number translator also determines the status of the called party, that is, whether it is a regular subscriber necessitating a charge for the call or a special subscriber for which there is no charge for the call. The supervisory processing circuit in conjunction with the associated memory provides a record of existing line conditions and is therefore capable of determining that the call has been answered by the called party. Thus, the information necessary to effect collection of deposited coins in the pay station may be effected directly by the common register processor and its associated circuits.

However, in a case where an add-on conference or other special features situation exists and the pay station subscriber desires to release leaving the other two parties in communication connection, control of coin collect at the pay station directly from the common register processor is accomplished only with great difficulty. To effect such direct control of the coin release operation under such conditions, it would be necessary to interrupt the communication connection between the original terminating subscriber and the third party subscriber while holding both subscribers against release so as to make the common register processor available for direct connection to the coin release mechanism in the pay station. However, the interruption of a communication connection merely to effect control over a releasing subscriber is an undesirable condition which should be avoided if possible.

It is therefore an object of the present invention to provide a common control telephone communication system having a pay station collect and return system capable of control over pay station coin collect and release without resort to the above-mentioned difficulties.

It is another object of the present invention to provide a coin collect and release ,system for use in conjuction with pay station telephone equipment which avoids the necessity of establishing a separate connection to a special trunk for coin collect or return upon release of the pay station subscriber.

It is still another object of the present invention to provide a coin collect and release system for use in conjunction with pay station telephone equipment wherein high voltage is used for effecting coin collect and release at the pay station equipment are provided directly at the pay station or in the subscriber line circuit and are thereby isolated from all reed relay crosspoints in the telephone system.

In accordance with the present invention, a special pay station adapter is provided for effecting control over the coin collect and release operations of a pay station telephone. In the pay station adapter normally existing conditions provide for automatic coin return upon release of the calling subscriber prior to completion of a call ro subsequent to completion of a "no charge" call. In addition, means are provided in the pay station adapter for receipt of a signal indication from the common register processer upon determination that a call has been completed from the pay station for which is required. This signal indication provided by the register processer via the junctor circuit in the common control system is retained in the pay station adapter and serves to effect automatic collect of the coins deposited at the pay station at the time of subscriber release without further recourse to the common register processer and other common equipment which may be occupied at that time, for example, with an add-on conference call. In addition, the control signal from the common register processor through the junctor to the pay station adapter for indicating a charge call condition is of much lower voltage than required for the coin collect or return operations so that proper coin release or collect control can be effected without endangering reed cross points in the line link network. The necessary control of the pay station equipment is thereby effected in a relatively simple and economical manner without need for separate connection to a special trunk or additional complicated common control equipment.

Figure 2:
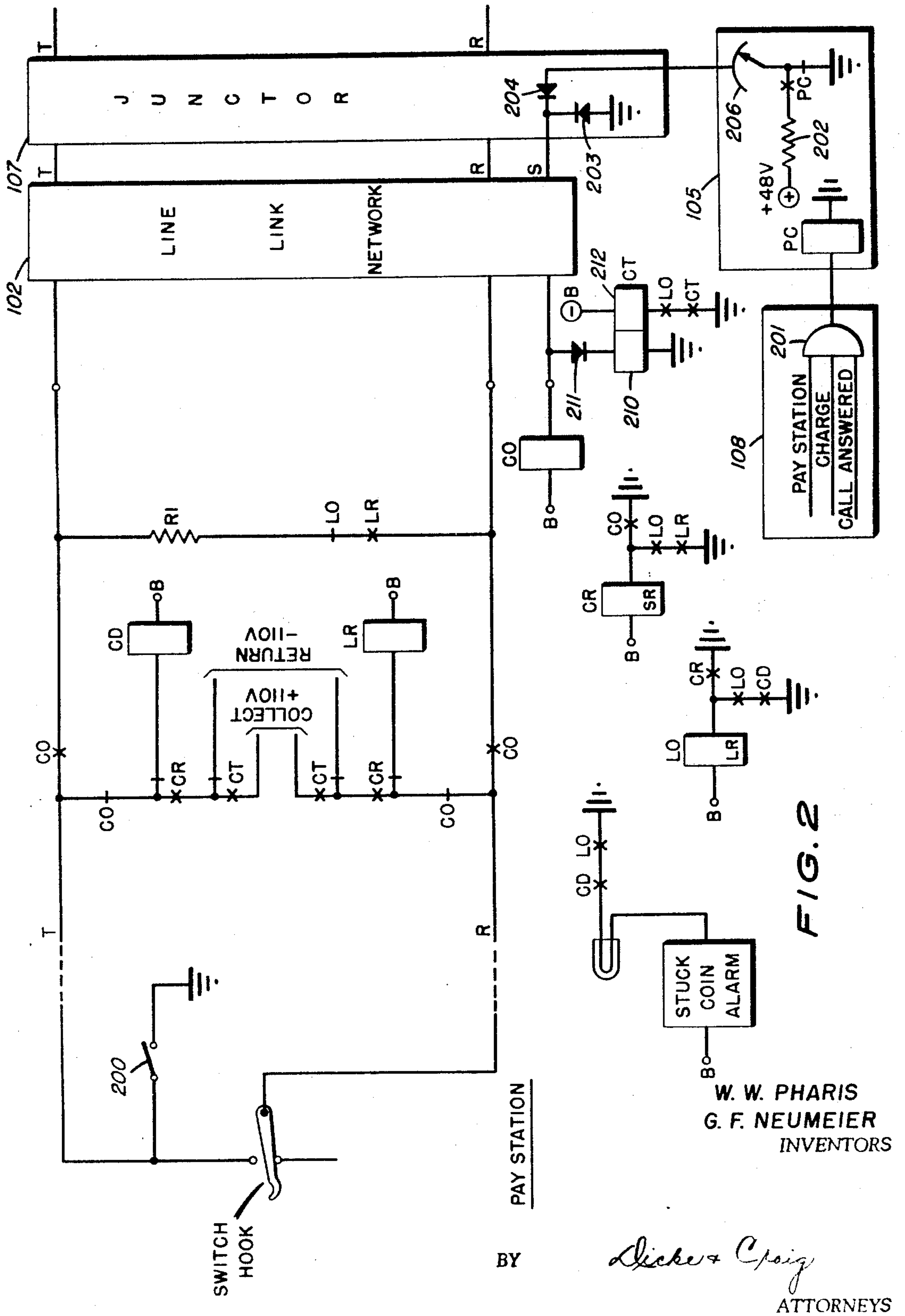

These and other objects, features and advantages of the present invention will become more apparent from the following detailed description of the present invention when taken in conjunction with the accompanying drawings, which disclose one embodiment of the present invention, and wherein:

FIGURE 1 is a schematic block diagram of the system in accordance with the present invention; and FIGURE 2 is a detailed circuit diagram of the pay station adapter which forms part of the system of FIGURE 1.

The embodiment of the present invention specifically disclosed herein is especially adapted for use in conjunction with the common control system disclosed in the above-mentioned applications of James G. Pearce et al.; however, it will be apparent from the following detailed description thereof that the present invention also has applicability to other common control systems and electronic telephone systems as well. In the following detailed description of the invention only so much of the entire common control system with which the present invention is associated has been disclosed as is necessary to a clear understanding of the invention. Remaining features of this automatic telephone system may be discerned from the specific descriptions presented in the above-referenced applications.

Referring more specifically to the drawings, and particularly to FIGURE 1, a pay station telephone designated 100 is connected through a pay station adapter and line circuit combination 101 in accordance with the present invention and line link network 102 to a universal junctor circuit 107 of the type disclosed in the above mentioned copending application of James G. Pearce et al. This junctor circuit 107 includes sensors or suitable relay controls capable of detecting changes in the line condition to the calling and called line circuits, which conditions are transmitted to a supervisory processing circuit 108 where they are compared with previously existing conditions as recorded in memory 109, or preserved by relay conditions, to determine changes in state and detect signalling conditions from the line circuits. As a result of the changes in the line conditions or detected signals from either of the line circuits, as determined in the supervisory processing circuit 108, suitable common equipment (not shown) is connected through the controls in the junctor circuit 107 under control of the register processer 106 for effecting the operations necessary to establishing a call between subscribers and providing additional class of service functions which may be available to one or both of the subscribers upon request.

In the well known manner, initiation of a call is detected at the line circuit by a line scanner 103 which then provides the number of the calling party to the number translator 104. The number translator 104 provides suitable class of service information and other related information concerning the characteristics of the calling party, such as the fact that the equipment initiating the call is pay station equipment, and also determines characteristics and class of service information relating to the called party in response to receipt of the called party number from the register processer, which determines the called number from the received dialed digits. Under the control of the register processer 106 and supervisory processing circuit 108, suitable control of the junctor 107 eventually results in connection between the pay station 100 and the called line circuit 110 via the line link network 102.

In accordance with the present invention, the fact that the calling subscriber is utilizing pay station equipment and the call is directed to a common line circuit requiring a charge for establishing the call is determined by the number translator 104 upon receipt of information from the line scanner 103 and the register processer 106 and provides this information back to the register processer 106. In addition, the supervisory processing circuit determines by comparison of existing line conditions extending to the called line circuit and comparing these line conditions to previously existing conditions that the called party has answered the call, thereby establishing a communication connection between the pay station 100 and the line circuit 110. These three conditions indicate that coins deposited at the pay station 100 for purposes of establishing the call are to be collected rather than returned upon release by the calling party. In accordance with the present invention, this condition results in the application of a control signal from the supervisory processing circuit 108 through relay buffer 105, the relay controls of junctor 107, and line link network 102 to the pay station adapter and line circuit combination 101 where the condition is recorded for use in controlling the coin collect operation upon release at the pay station 100, as will be explained in greater detail in connection with FIG. 2.

Referring now to FIG. 2 of the drawing, the transmission leads T and R interconnect the pay station equipment with the line circuit and these transmission lines are switched progressively in the well known manner until connection is effected between the calling subscriber and the called subscriber line circuit. The line relay LR normally found in the line circuit is connected between the ring lead R and a battery source B through relay contacts of cut-off relay CO. A coin detect relay CD is also provided and is connected between the tip lead T and the battery source B through other contacts of relay CO. The cut-off relay CO is also provided with its normal association in the line circuit connected between the battery source B and the sleeve lead S connected to a register, first selector, or the like in the conventional manner.

In accordance with the present invention, there is provided in conjunction with the line circuit, a coin refund relay CR, which as indicated hereinafter, serves to connect the normal positive or negative 110 volt potential for coin collect or coin refund, respectively, to the tip lead T and the ring lead R to the subscriber equipment under the proper conditions. The relay CR is a slow release relay having a release delay time of at least 500 milliseconds. Associated with the relay CR is a lock out relay LO which serves to prevent association of the line circuit with common switching equipment in event of a stuck coin condition. There is also provided in accordance with the present invention a collect relay CT connected to the sleeve lead S to the line link network and junctor for receiving a signal representing a coin collect condition and for storing said signal for subsequently effecting automatic coin collect upon release at the pay station equipment.

The features of the present invention may be more easily undersood from a detailed description of the operation thereof. Since the subscriber equipment with which the present invention is associated is pay station equipment, an off hook condition resulting in closing of the switch hook contact with the normal DC loop closed across the associated pay station line will not activate the control relays in the line circuits since both the coin detect relay CD and the line relay LR are connected to a common battery source B. However, deposit of a coin in the pay station equipment unbalances the line by closing ground through the coin magnet at the pay station, represented by a switch 200, to the electrical midpoint of the line loop so that the DC circuit is completed from ground through the relays CD and LR to the battery source B. This energizes both the coin detect relay CD and the line relay LR completing a DC bridge across the T and R leads through the resistor R1 to the line link network to cause connection between the line circuit and the junctor.

As soon as the associated line circuit is extended into the switching system to a register, first selector or the like, the cutoff relay CO is operated in the normal manner through extension of a ground back along the sleeve lead S to the relay. Upon energization of the cut off relay CO, the circuit to the coin refund relay CR will be completed through the contacts of the CO relay to ground, energizing this relay, which is turn completes the circuit from the lockout relay LO through the contacts of the CR relay to ground energizing this relay also. The energization of the cut off relay CO also disconnects the coin detect relay CD and the line relay LR from the T and R leads, respectively, due to the open contacts of the CO relay in the lines connected thereto and provides connection of the T and R lines from the subscriber equipment through the closed contacts of the CO relay to the line circuit. At the same time, energization of the lockout relay CO opens the DC bridge through resistor R1 which extends across the T and R leads and which contains the open contacts of the energized LO relay. This is permissive, since a DC bridge is already provided at the subscriber equipment across the T and R leads, which bridge is extended into the line circuit through actuation of the CO relay, held by the ground extended from the switching equipment. Thus, as a result of energization of the cut off relay CO, the coin detect relay CD and the line relay LR will be disabled leaving only the CO, CR, and LO relays operated.

The CR relay serves to make the coin control voltages necessary for coin refund and coin collect available for connection to the T and R lines at the appropriate time. A voltage source provides a −110 volt signal through the normally closed contacts of the relay CT, which upon energization disconnects the negative voltage and connects the +110 volt signal to the contacts of the CR relay. If CR is energized, the voltage signal of either polarity will be blocked from the CD and LR relays and will be made available for connection to the T and R leads at the appropriate time by the relay CO.

Should the calling subscriber disconnect before the call he has initiated is complete, the circuit to the cut off relay CO will be opened due to the loss of the holding ground, which opens the circuit to the coin refund relay CR. However, this relay being a slow release relay will remain energized after the cut off relay CO is deenergized. Under these conditions, the negative 110 volt refund voltage is extended during the delay time as a voltage impulse through the tip lead T by way of closed contacts of the deenergized LR and CO relays where it is applied back to the subscriber equipment effecting refund of any coin left in the pay station. When the relay CR finally restores, it opens the connection from ground to the relay LO. At this point, if the coin detect relay CD is not energized, the lockout relay LO will be deenergized, returning the line to normal.

On the other hand, if instead of disconnecting, the subscriber completes his call to another subscriber for which a charge is required, the condition including a completed call from a pay station to a "charge" subscriber initiates a signal condition from the supervisory processing circuit, as illustrated in FIG. 2. An AND gate 201 in the supervisory processing circuit receives indication from the number translator 104 via the register processer 106 concerning the fact that the originating line circuit is connected to pay station equipment and that the called or terminating line circuit is not of the "no charge" type of terminating circuit. In addition, by comparison of present line conditions with previously existing line conditions stored in memory 109 it is determined when the called party has answered. These three conditions enable AND gate 201 to thereby actuate relay PC in the relay buffer 105.

The relay buffer 105 is connected to the junctor 107 and other junctors in the system on a time share basis by an electronic scanner 206, which effects connection between the supervisory processing circuit and a particular junctor 107 via the relay buffer 105 during the time slot in the memory 109 assigned to that particular junctor. With the relay PC in the relay buffer 105 inactive, the scanner 206 will connect ground via the normally closed contact of the relay PC to the sleeve lead S of the junctor 107. The junctor 107 is described and illustrated in greater detail in the aforementioned applications of James G. Pearce et al. and is shown in FIGURE 2 only as including sleeve lead S connected between the junctor 107 and the line link network 102. The main holding ground applied back from the junctor 107 through the line link network 102 to the line circuit for holding the cross points in the line link network is provided via diode 203 connected to the sleeve lead S. In addition, ground is provided from the relay buffer 105 via the electronic scanner 206 and connected to the sleeve lead S through diode 204.

When the relay PC in the relay buffer 105 is actuated in response to enabling of AND gate 201 in the supervisory processing circuit 108, the ground connection to the electronic scanner 206 is removed and a positive 48 volt source is connected through resistor 202 to the scanner 206 for application in the proper time slot to the sleeve S in the junctor 107 via diode 204. The 48 volt signal is applied from the junctor 107 through the line link network 102 to the pay station adapter and line circuit 101, which is illustrated in detail in FIG. 2. It should be noted that the 48 volt signal will be generated as soon as the supervisory processing circuit detects that the call has been answered by the called subscriber and since the other two conditions necessary for enabling the AND gate 201, i.e., that the called party is using pay station equipment and that the called line circuit is not a "no charge" type of terminating circuit, will be determined prior to this time. Application of the 48 volt signal back through the sleeve lead from the junctor through the line link network to the pay station adapter and line circuit serves to actuate the winding 210 of the collect relay CT via diode 211 connected to the sleeve lead S.

Upon energization of the winding 210 of the relay CT, with the lockout relay LO actuated, the winding 212 of the CT relay will be actuated through its own contacts and the closed contacts of the LO relay. This winding will therefore remain actuated as long as the lockout relay LO is actuated. Contacts of the colect relay CT are connected in the circuit to the negative 110 volt return voltage and the positive 110 volt collect voltage so that actuation of the CT relay connects the positive 110 volt source through the closed contacts of relay CR to the T and R leads upon disabling of the cutoff relay CO when the subscriber releases, providing for a collect coin condition at the pay station rather than a return coin condition.

Thus, it is noted that if no signal is received from the supervisory processing circuit via the junctor 107 indicating a collect instruction, a coin return operation will be automatically effected upon release at the pay station. This is the normally prevailing condition at the pay station during initiation of a call. However, the normal condition is overridden by application of the 48 volt signal from the relay buffer through the junctor to the pay station adapter to actuate the collect relay CT as indicated above.

If there is a coin stuck in the mechanism at the pay station, the ground applied to the tip lead T through the coin magnet at the pay station will remain after coin refund or coin collect is attempted through application of the negative or positive 110 volt signal, respectively, across the pay station equipment. This will provide a complete circuit from ground through the closed contacts of deenergized relays CO, LR and CR and the coin detect relay CD to voltage source B which will energize relay CB and will hold the lockout relay LO against deenergization due to the contacts of the CD relay connected therein when the coin refund relay CR releases. As long as the lockout relay LO remains energized, the DC bridge through the resistance R1 connected between the leads T and R will remain open so that subsequent attempts to obtain a line circuit at the pay station by going off hook will be unsuccessful thereby preventing further seizure of the regular line circuit until the stuck coin condition is alleviated. In addition, simultaneous actuation of the coin detect relay CD and the lockout relay LO indicates a stuck coin condition and serves to actuate stuck coin alarm 215 which provides a visual and/or audio indication of this malfunction.

As indicated above, no calls can be originated at the pay station having the stuck coin condition until the coin is cleared; however, each time the handset at the pay station is lifted closing the switch hook contacts, the line relay LR operates due to connection of the ring lead R through the coin magnet switch 200 to ground. Actuation of the line relay LR simultaneously with actuation of the lockout relay LO will complete the circuit through the coin refund relay CR, once again causing a refund or collect potential depending upon the condition of the relay CT to be applied across the pay station equipment repeating actuation of the coin mechanism therein. Thus repeated lifting of the handset at the subscriber equipment or flashing thereof in an attempt to obtain a line circuit or refund of a deposited coin result in the application of a plurality of release pulses to the subscriber equipment, which pulses may eventually serve to release the stuck coin and restore normal operation. As soon as the stuck coin is cleared from the locked out pay station, ground is immediately removed from the lead T which result in release of the coin detect relay CD which in turn releases the lockout relay to restore the line to normal service. The collect relay CT will also release as a result of the release of relay LO.

It should therefore be apparent that the present invention provides for completely automatic coin refund and collect each time the subscriber circuit is released to eliminate the need for coin refund supervision in expensive common control equipment and to eliminate the necessity for disrupting common control operations for effecting control by a special features trunk to initiate coin release. In addition, the circuit of the present invention provides for release of the coin at the pay station without application of the high voltage release or collect signals through the cross points of the line link network thereby eliminating the possibility of damage to these cross points from the excessive voltage. The circuit of the present invention provides for automatic coin deposit detection in the line circuit, providing inherent stuck coin detection and automatic control of the equipment to block access to common switching equipment until the stuck coin is released. However, in addition to detection of the malfunction in the equipment the circuit of the present invention inherently provides means whereby lifting of the handset or flashing of the hookswitch by the subscriber serves to continuously actuate the coin mechanism in the pay station equipment, which may free the stuck coin and return normal service without special action by telephone company maintenance personnel.

While we have shown and described several embodiments in accordance with the present invention, it is understood that the same is not limited thereto but is susceptible of numerous changes and modifications as known to a person skilled in the art and we therefore do not wish to be limited to the details shown and described herein, but intend to cover all such changes and modifications as are encompassed by the scope of the appended claims.

We claim:

1. In a telephone communication system including a line circuit, coin operated subscriber equipment having switch hook means for effecting connection of said subscriber equipment to said line circuit and coin means for effecting collection and return of coins deposited therein in response to a first voltage of selective polarity, a pay station adaptor connected to said line circuit comprising a voltage source providing both the positive and negative polarities of said first voltage, first relay means normally connecting said negative polarity of said first voltage to said line circuit, second relay means in said line circuit for connecting said first voltage from said first relay means to said coin means in response to release of said switch hook means, and third relay means responsive to detection of a pay call condition for switching said first relay means to apply said positive polarity of said first voltage to said line circuit.

2. The combination defined in claim 1 further including common control means for effecting connection between a calling subscriber utilizing said coin operated subscriber equipment and a called subscriber.

3. The combination defined in claim 2 wherein said common control means includes processor means for actuating said third relay means upon detection of completion of connection between said calling subscriber and a called subscriber requiring collection of coins deposited in said coin operated subscriber equipment.

4. The combination defined in claim 3 further including a plurality of universal junctor circuits for interconnecting calling and called line circuits under control of said common control means, and a line link network providing a plurality of paths between said line circuit and each universal junctor circuit, said processor means providing a control signal through a junctor circuit and said line link network to said third relay means in said line circuit.

5. The combination defined in claim 4 wherein said third relay means includes a bipolar relay and holding means for holding said relay in the actuated condition once actuated.

6. The combination defined in claim 5 further including lock-out relay means responsive to failure of said coin means to collect or return coins therein upon application of said first voltage thereto for preventing use of said line circuit.

7. In a telephone communication system including a line circuit, coin operated subscriber equipment having switch hook means for effecting connection of said subscriber equipment to said line circuit, and coin means for effecting collection and return of coins deposited therein in response to a first voltage of selective polarity, a coin detect relay and a line relay in said line circuit operated in response to operation of said subscriber equipment, common control means for effecting connection between a calling subscriber and a called subscriber, at least one universal junctor circuit for interconnecting calling and called line circuits under control of said common control means, a voltage source providing both the positive and negative polarities of said first voltage, a cut-off relay actuated in response to connection of said line circuit to said junctor circuit through said line link network as initiated by said line relay, said cutoff relay normally connecting said coin detect relay and said line relay to said subscriber equipment in the non-actuated condition thereof and connecting said junctor through said line link network directly to said subscriber equipment in the actuated condition thereof, and relay means responsive to said common control means for applying a selective polarity of said first voltage to said subscriber equipment upon release of said cutoff relay.

8. The combination defined in claim 7 further including a coin release relay energized by said cutoff relay and having a slow release time as compared to said cutoff relay, said coin release relay connecting said first voltage source to normally closed contacts of said cutoff relay for application of said first voltage to said subscriber equipment subsequent to release of said cutoff relay.

9. The combination defined in claim 8 further including lockout relay means actuated by said coin release relay for preventing connection of said line circuit to said junctor circuit upon operation of said line relay coincident therewith.

10. The combination defined in claim 9 wherein said relay means includes first relay means normally connecting the negative polarity of said first voltage to said coin release relay, and second relay means responsive to detection of a pay call condition for switching said first relay means to apply the positive polarity of said first voltage to said coin release relay.

11. The combination defined in claim 10 wherein said common control means includes processor means for actuating said second relay means upon detection of completion of connection between said calling subscriber and a called subscriber requiring collection of coins deposited in said coin operated subscriber equipment.

12. The combination defined in claim 11 wherein said processor means provides a signal of lower voltage than said first voltage through said junctor circuit and said line link network in actuation of said second relay means.

References Cited

UNITED STATES PATENTS

| | | | |
|---|---|---|---|
| 2,616,974 | 11/1952 | Dehn | 179—6.3 |
| 3,027,424 | 3/1962 | Breed | 179—6.3 |
| 3,409,739 | 11/1968 | Joel | 179—6.3 |

KATHLEEN H. CLAFFY, Primary Examiner

J. S. BLACK, Assistant Examiner